United States Patent [19]

Brannon et al.

[11] Patent Number: 4,801,389

[45] Date of Patent: Jan. 31, 1989

[54] HIGH TEMPERATURE GUAR-BASED FRACTURING FLUID

[75] Inventors: Harold D. Brannon, Glenpool; Richard M. Hodge, Broken Arrow, both of Okla.; Kevin W. England, Highlands Ranch, Colo.

[73] Assignee: Dowell Schlumberger Incorporated, Tulsa, Okla.

[21] Appl. No.: 80,738

[22] Filed: Aug. 3, 1987

[51] Int. Cl.$^4$ .............................................. E21B 43/26
[52] U.S. Cl. .................................. 252/8.551; 166/308; 252/315.3
[58] Field of Search ........................ 252/8.551, 315.3; 166/308

[56] References Cited

U.S. PATENT DOCUMENTS

| | | | |
|---|---|---|---|
| 3,301,723 | 1/1967 | Chrisp | 252/315.3 X |
| 3,888,312 | 6/1975 | Tiner et al. | 252/8.551 X |
| 3,959,003 | 5/1976 | Ostroot et al. | |
| 3,979,303 | 9/1976 | Kang et al. | |
| 4,021,355 | 5/1977 | Holtmyer et al. | 252/8.551 |
| 4,033,415 | 7/1977 | Holtmyer et al. | 166/308 |
| 4,313,834 | 2/1982 | Harris | 252/8.553 |
| 4,324,668 | 4/1982 | Harris | |
| 4,455,241 | 6/1984 | Swanson | 252/8.551 |
| 4,477,360 | 10/1984 | Almond | 252/8.551 |
| 4,534,870 | 8/1985 | Williams | 252/8.551 |
| 4,579,670 | 4/1986 | Payne | 252/8.551 |
| 4,657,080 | 4/1987 | Hodge | 166/308 |
| 4,657,081 | 4/1987 | Hodge | 166/308 |
| 4,683,068 | 7/1987 | Kucera | 252/8.551 |
| 4,686,052 | 8/1987 | Baranet et al. | 252/8.551 |

FOREIGN PATENT DOCUMENTS 2108122 5/1983 United Kingdom .

Primary Examiner—Herbert B. Guynn
Attorney, Agent, or Firm—S. A. Littlefield

[57] ABSTRACT

A fracturing fluid based on quar gum exhibiting good viscosity and stability at temperatures from about 80° C. to at least about 120° C. The fracturing fluid includes a guar gum, a zirconium or hafnium cross-linking agent, and a bicarbonate salt in an aqueous solution at a pH from about 8 to about 10.

20 Claims, No Drawings

HIGH TEMPERATURE GUAR-BASED FRACTURING FLUID

FIELD OF THE INVENTION

The invention relates to a composition and method of fracturing subterranean formations at high temperatures utilizing natural guar-based fluid.

TECHNOLOGY REVIEW

The treatment of subterranean formations penetrated by a well bore to stimulate the production of hydrocarbons therefrom or the ability of the formation to accept injected fluids has long been known in the art. One of the most common methods of increasing productivity of a hydrocarbon-bearing formation is to subject the formation to a fracturing treatment. This treatment is effected by injecting a liquid, gas or two-phase fluid which generally is referred to as a fracturing fluid down the well bore at sufficient pressure and flow rate to fracture the subterranean formation. A proppant material such as sand, fine gravel, sintered bauxite, glass beads or the like can be introduced into the fractures to keep them open. The propped fracture provides larger flow channels through which an increased quantity of a hydrocarbon can flow, thereby increasing the productive capability of a well.

Certain hydrophilic materials, hereinafter referred to as "gelling agents", have been used to increase the viscosity of a liquid fracturing fluid. High viscosity aqueous fracturing fluids are useful in the development of wider fractures to improve productivity further into the formations, increase the proppant carrying capacity of the fracturing fluids, and permit better fluid loss control.

High viscosity treating fluids are useful in carrying out subterranean well completions, for transporting sand in sand and gravel packing procedures and in various other well treating procedures. Also, high viscosity treating fluids have utility in cleaning applications such as in the cleaning of tubular goods, production equipment, and industrial equipment. Equipment typically cleaned includes oil well piping tubes, tanks and process equipment, boilers, heat exchangers, conventional and nuclear power plants and accessory equipment and the like.

Hydrophilic gelling agents, such as partially hydrolyzed polyacrylamides, natural gums and modified natural gums, celluloses and xanthan polymers, have been utilized before to increase the viscosity of aqueous solutions. However, the gels produced with such gelling agents generally have limited stability at elevated temperatures, i.e., the viscosity of the gelled aqueous solutions decreases substantially after only a short period of time. Chemicals which cross-link or complex hydrated gelling agents have also been utilized heretofore for further increasing their viscosity. For example, U.S. Pat. Nos. 3,888,312; 4,021,355 and 4,033,415 describe and claim organotitanate, permanganate salts, and antimony cross-linking agents respectively. U.S. Pat. No. 3,959,003 teaches the use of a water soluble cellulose complexed with a polyvalent metal salt as a thixotropic agent for cementing compositions. U.S. Pat. No. 3,979,303 teaches an oil well drilling fluid containing complex polysaccharides, and U.S. Pat. Nos. 4,313,834 and 4,324,668 disclose and claim acidic treating fluids of a hydratable gelling agent and a zirconium cross-linking agent which further increases the viscosity.

U.S. Pat. No. 4,579,670 describes cross-linked fracturing fluids including a hydratable polysaccharide in aqueous solution, a transition metal chelate cross-linking initiator, and a cross-linking rate controller which is either a rate accelerator or a rate retarder.

Among hydratable gelling agents, natural guar gum is relatively inexpensive, and requires little processing. However, crosslinked fracturing fluids prepared with a natural guar gum provide lower viscosities at high temperatures. It would be desirable to crosslink a natural guar gum fracturing fluid and obtain high temperature performance comparable to fluids prepared by cross-linking the more expensive polymers.

SUMMARY OF THE INVENTION

The present invention provides a fracturing fluid based on natural guar gum useful at high temperatures. The natural guar gum based fracturing fluid of the present invention exhibits good viscosity and is particularly stable at moderate and high temperatures. As used herein, moderate temperatures refer to temperatures of about 80° C. and above, and high temperatures refer to temperatures of about 120° C. and above. The present invention therefore provides a particularly inexpensive and convenient fracturing fluid.

The composition of the present invention is a high temperature fracturing fluid comprising a guar gum, and a cross-linking agent, and a stabilizing agent, in an aqueous solution.

The method of the present invention includes using the composition of the invention for well stimulation to increase well productivity by creating wider fractures through which hydrocarbons may flow. The method of the present invention provides improved transport and placement of proppant material in subterranean formations.

DETAILED DESCRIPTION OF THE INVENTION

The high temperature fracturing fluids of the present invention are prepared from natural guar gum, a cross-linking agent, and a stabilizing agent for use in the pH range of 8 to 10. By proper selection of the crosslinker composition and the stabilizing agent concentration, crosslinked natural guar gum fluids may be prepared which exhibit delayed crosslinking and improved high temperature performance.

In Table 1, the viscosity of cross-linked hydroxypropyl guar (HPG) (fluid 1) is compared to the viscosity of cross-linked guar (fluid 2). By comparing the apparent viscosity after 4 hours at 121° C. (250° F.) it is seen that the apparent viscosity of HPG at high temperature is clearly superior to that of cross-linked guar. Due to the poor high-temperature performance of cross-linked guar, other more expensive polymers have been used at high temperatures.

TABLE 1

| Comparison of the Viscosity of Cross-linked HPG and Guar | | |
|---|---|---|
| Fluid Composition: | | |
| | Additive | Concentration |
| Fluid 1 | Hydroxypropyl Guar | 0.42% by weight |
| | KCl | 2% by weight |
| | $Na_2S_2O_3 \cdot 5H_2O$ | 0.12% by weight |
| | $Na_2CO_3$ | to pH 8.5 |
| | Zr Triethanolamine | 0.0025% Zr by weight |
| Fluid 2 | Guar | 0.42% by weight |

TABLE 1-continued

Comparison of the Viscosity of Cross-linked HPG and Guar

| | |
|---|---|
| KCl | 2% by weight |
| Na$_2$S$_2$O$_3$.5H$_2$O | 0.12% by weight |
| Na$_2$CO$_3$ | to pH 8.5 |
| Zr Triethanolamine | 0.0025% Zr by weight |

Fluid Performance:
Apparent Viscosity (centipoise) @ 170 sec$^{-1}$
@ 121° C. after

| Fluid # | 0 hours | 1 hour | 2 hours | 3 hours | 4 hours |
|---|---|---|---|---|---|
| 1 | 92 | 99 | 86 | 76 | 68 |
| 2 | 23 | 23 | 25 | 28 | 25 |

Table 2 compares the performance of two pH-control agents, sodium bicarbonate and sodium carbonate. Tests performed with cross-linked guar show that both sodium bicarbonate and sodium carbonate maintain the desired pH after 4 hours at 121° C. (250° F.).

TABLE 2

Performance of pH-control Agents

Fluid Composition:

| Additive | Concentration |
|---|---|
| Guar | 0.42% by weight |
| KCl | 2% by weight |
| Na$_2$S$_2$O$_3$.5H$_2$O | 0.12% by weight |
| Zr Triethanolamine | 0.0025% Zr by weight |

Fluid Performance:

| pH-control Additive | Conc. (g/l) | pH before test | pH after 4 hours at 121° C. |
|---|---|---|---|
| NaHCO$_3$ | 0.5 | 9.0 | 8.83 |
| Na$_2$CO$_3$ | * | 9.0 | 8.75 |

*sufficient to produce pH = 8.5

Surprisingly, although both sodium bicarbonate and sodium carbonate were equally suited to maintain pH-control in pH range of 8 to 10 as illustrated in Table 2, crosslinked fluids containing sodium bicarbonate and sodium carbonate did not exhibit similar fluid performance. Using the same fluid composition described in Table 2, the apparent viscosity of a solution containing sodium bicarbonate was compared with the apparent viscosity of a solution containing sodium carbonate at 24° C. (75° F.), and at 121° C. (250° F.). As can be seen from Table 3, the solution containing bicarbonate provides a lower viscosity at ambient temperature (24° C.), and a higher viscosity at 121° C. (250° F.).

TABLE 3

The Effect of pH-control Agents on Cross-linked Fluid Viscosity

Fluid Composition:
From Table 2
Fluid Performance:
Apparent Viscosity (centipoise) @ 170 sec$^{-1}$

| pH-control Additive | Conc. (g/l) | @ 24° C. after 3 minutes | @ 121° C. 0 hours | 1 hour | 2 hours |
|---|---|---|---|---|---|
| NaHCO$_3$ | 0.5 | 92 | 117 | 113 | 89 |
| Na$_2$CO$_3$ | * | 308 | 23 | 23 | 25 |

*sufficient to produce pH = 8.5

Without limiting the invention, it is believed that the lower viscosity observed at ambient temperature indicates delayed cross linking. Delayed cross linking is an advantageous property of fracturing fluids because it avoids excessive frictional losses during introduction of the fracturing fluid into the wellbore. The discovery that only the bicarbonate containing fluid exhibits a low viscosity at ambient temperature and a higher viscosity at elevated temperature is both surprising and very desirable.

Table 4 illustrates the effect of bicarbonate concentration on the rate of viscosity development at ambient temperature and the fluid viscosity at high temperature. Viscosity development of cross linked fluids was measured using the Vortex closure test. The Vortex closure test is described in U.S. Pat. Nos. 4,657,080 and 4,657,081, incorporated herein by reference. As described therein, longer Vortex closure times indicate slower cross linking rates. As illustrated in Table 4, increasing the bicarbonate concentration increased the vortex closure time, increased the fluid viscosity at 121° C., and stabilized the fluid pH during the test. However, as illustrated by the data in Table 4, the bicarbonate concentration must lie within a certain range to obtain the desired performance with a given cross linking compound. For example with fluid #1 (cross linker zirconium triethanolamine), the bicarbonate concentration had to be greater than or equal to about 363 ppm and less than about 3000 ppm to obtain optimum high temperature performance. At bicarbonate concentrations below about 363 ppm, fluid #1 provided no improvement in viscosity at elevated temperature. At a bicarbonate concentration of about 2179 ppm, the viscosity of fluid #1 at 121° C. was diminished. For fluid #2, the minimum bicarbonate concentration required for optimum performance was about 1089 ppm.

While the mechanism responsible for improved performance obtained with crosslinked guar and bicarbonate is not understood, it does not appear to be simply pH-control and/or simply delayed cross linking. If the improved performance was due simply to delayed cross linking, fluid compositions 1 and 2 from Table 4 delayed with compounds other than bicarbonate should provide performance at elevated temperature similar to fluids 1 and 2 containing the optimum concentration of bicarbonate. In Table 5, fluid compositions 1 and 2 are delayed with compounds reported in the literature. Fluid 1 was delayed with 2,4 pentanedione and the pH was adjusted with triethanolamine. Fluid 2 was delayed with triethanolamine and the pH was maintained with a non-delaying amount of NaHCO$_3$ (see U.S. Pat. No. 4,579,670). The results contained in Table 5 show two fluids with delay times similar to the fluids in Table 4 which provided improved performance. The performance of these fluids (1C and 2E) at 121° C. is compared to the performance of fluids 1D and 2A (fluid compositions containing no delay additive) in Table 6. Note the delayed fluid compositions 1C and 2E performed only slightly better than the non-delayed compositions 1D and 2A. Furthermore, neither 1C nor 2E matched the performance of the fluids reported in Table 4 which contained an optimum concentration of NaHCO$_3$ only.

TABLE 4

Vortex Closure Results

| Additive | Fluid Composition: Concentration |
|---|---|

Fluid 1

TABLE 4-continued

Vortex Closure Results

| | |
|---|---|
| Guar | 0.42% by weight |
| KCl | 2% by weight |
| $Na_2S_2O_3.5H_2O$ | 0.12% by weight |
| Zr Triethanolamine | 0.0022% Zr by weight |
| Fluid 2 | |
| Guar | 0.42% by weight |
| KCl | 2% by weight |
| $Na_2S_2O_3.5H_2O$ | 0.12% by weight |
| Zr Lactate | 0.0025% Zr by weight |

Fluid Performance:

| Fluid # | $HCO_3^-$ Conc. (ppm) | pH Before X-linker Addition | Closure Time (s) | pH After X-linker Addition | Viscosity cp @ 170 sec$^{-1}$ at 121° C. after | | | pH After test |
|---|---|---|---|---|---|---|---|---|
| | | | | | 0 hr | 2 hr | 4 hr | |
| 1 | 0 | 6.59 | 64 | 9.29 | 22 | 23 | 22 | 10.1 |
| 1 | 182 | 7.92 | 38 | 9.19 | 17 | 11 | 11 | 8.93 |
| 1 | 363 | 8.16 | 101 | 9.13 | 117 | 89 | 67 | 8.83 |
| 1 | 726 | 8.43 | >900 | 9.03 | 156 | 91 | 62 | 8.83 |
| 1 | 1089 | 8.35 | >900 | 8.88 | 147 | 101 | 52 | 8.85 |
| 1 | 1452 | 8.47 | >900 | 8.88 | 149 | 87 | 50 | 8.85 |
| 1 | 2179 | 8.70 | >900 | 8.91 | 78 | 56 | — | 8.75 |
| 2 | 0 | 8.49 | 18 | 6.56 | 7 | 4 | 5 | 6.94 |
| 2 | 182 | 8.05 | 52 | 7.80 | 17 | 11 | 15 | 7.22 |
| 2 | 363 | 8.17 | 68 | 7.73 | 11 | 9 | 19 | 6.90 |
| 2 | 726 | 8.40 | 103 | 8.16 | 17 | 30 | 29 | 7.83 |
| 2 | 1089 | 8.50 | >900 | 8.40 | 70 | 95 | 96 | 7.40 |
| 2 | 1452 | 8.53 | >900 | 8.40 | 143 | 184 | 149 | 8.26 |
| 2 | 2179 | 8.71 | >900 | 8.68 | 139 | 107 | 81 | 8.10 |

TABLE 5

Vortex Closure Results

Fluid Composition:

| | Additive | Concentration |
|---|---|---|
| Fluid 1 | Guar | 0.42% by weight |
| | KCl | 2% by weight |
| | $Na_2S_2O_3.5H_2O$ | 0.12% by weight |
| | Zr Triethanolamine | 0.0022% Zr by weight |
| Fluid 2 | Guar | 0.42% by weight |
| | KCl | 2% by weight |
| | $Na_2S_2O_3.5H_2O$ | 0.12% by weight |
| | Zr Lactate | 0.0025% Zr by weight |

Fluid Performance:

| Fluid # | pH-Control Additive | Conc. | pH | Delay Additive* | (g/l) | Vortex Time (min:sec) | pH after x-linking |
|---|---|---|---|---|---|---|---|
| 1A | TEA | 0.48 g/l | 8.5 | 2,4 Pdione | 0.24 | 00:22 | 8.97 |
| 1B | TEA | 0.86 g/l | 8.5 | " | 0.48 | 3:16 | — |
| 1C | TEA | 1.39 g/l | 8.5 | " | 0.96 | >20 minutes | 8.70 |
| 1D | $NaCO_3$ | to pH | 8.5 | — | — | 00:44 | 9.05 |
| 2A | $NaHCO_3$ | 0.1 g/l | 8.4 | None | 0.00 | 00:22 | — |
| 2B | $NaHCO_3$ | 0.1 g/l | 8.5 | TEA | 0.29 | 2:27 | 8.51 |
| 2C | $NaHCO_3$ | 0.1 g/l | 8.5 | " | 0.43 | 4:37 | — |
| 2D | $NaHCO_3$ | 0.1 g/l | 8.5 | " | 0.72 | >10 minutes | — |
| 2E | $NaHCO_3$ | 0.1 g/l | 8.5 | " | 0.86 | >10 minutes | 8.90 |

*2,4 Pdione is 2,4-pentanedione.

TABLE 6

The Effect of Delay Additives on Cross-linked Viscosity

Fluid Composition: From Table 5

Fluid Performance:

| | Apparent Viscosity (centipoise) @ 170 sec$^{-1}$ | | | | | |
|---|---|---|---|---|---|---|
| | 24° C. after | @ 121° C. after | | | | |
| Fluid # | 3 minutes | 0 hours | 1 hour | 2 hours | 3 hours | 4 hours |
| 1C | 68 | 108 | 45 | 33 | 30 | — |
| 1D | 308 | 23 | 23 | 25 | 28 | 25 |
| 2E | 55 | 32 | 27 | 23 | 29 | 36 |
| 2A | 171 | 16 | 14* | | | |

*Viscosity after 0.5 hours at 121° C.

DESCRIPTION OF THE PREFERRED EMBODIMENTS

In order that those skilled in the art may better understand how the present invention may be practiced, the following Examples are given by way of illustration and not by way of limitation. All parts and percentages are by weight unless otherwise noted.

The compositions of the present invention may be prepared by mixing deionized water, 2% potassium chloride, and 0.025% (vol/vol) of polypropylene glycol (an antifoaming agent) to form a mixwater. The mixwater is placed in a blender, and mixed at approximately 2000 rpm, while the required quantity of guar gum is added. The guar gum is mixed for approximately 30 minutes to fully hydrate the guar. Thereafter the desired amount of sodium bicarbonate is added along with 0.12% of sodium thiosulfate (a high temperature gel stabilizer). The solution is mixed for about 30 minutes to effect solubilization. The resulting gel is aged for at least about one hour.

The zirconium cross-linking agent may, if necessary, be diluted with deionized water before use. The diluted solution is allowed to age for at least about 30 minutes prior to use.

The guar gel is mixed at about 2000 rpm, and the zirconium solution is added to the vortex. The viscosity of the solution thus prepared is measured in a Fann model 50C viscometer with a R1/B5 rotor/bob configuration. The sample is pressurized to 400 psi and sheared at 100 rpm (85 sec$^{-1}$) for three minutes. To measure ambient viscosity, a shear rate ramp is used in 50 rpm increments from 250 rpm to 50 rpm. Upon completion of the ambient temperature measurement, the shear rate is returned to 100 rpm. The bath temperature is then increased at about 5.5° C. per minute to the test temperature. When the sample temperature is within 3° C. of the set point, another shear rate ramp is performed, which is the test "T=0".

EXAMPLE #1

Test temperature: 121° C.
Guar gum concentration: 0.42%
Bicarbonate concentration: 1453 ppm
Crosslinker: zirconium sodium trilactate
Zirconium concentration: 29 ppm
Crosslinked pH: 8.5

| Time (hrs.) | RT | 0 | 0.5 | 1 | 1.5 | 2 | 2.5 | 3 | 3.5 | 4 |
|---|---|---|---|---|---|---|---|---|---|---|
| Visc. (cps) | 62 | 143 | 156 | 157 | 191 | 184 | 178 | 167 | 158 | 149 |

EXAMPLE #2

Test temperature: 121° C.
Guar gum concentration: 0.42%
Bicarbonate concentration: 1453 ppm
Crosslinker: zirconium diisopropylamine lactate
Zirconium concentration: 29 ppm
Crosslinked pH: 8.5

| Time (hrs.) | RT | 0 | 0.5 | 1 | 1.5 | 2 | 2.5 | 3 | 3.5 | 4 |
|---|---|---|---|---|---|---|---|---|---|---|
| Visc. (cps) | 68 | 149 | 95 | 76 | 64 | 54 | — | — | — | — |

EXAMPLE #3

Test temperature: 121° C.
Guar gum concentration: 0.42%
Bicarbonate concentration: 1453 ppm
Crosslinker: zirconium triethanolamine lactate
Zirconium concentration: 29 ppm
Crosslinked pH: 8.5

| Time (hrs.) | RT | 0 | 0.5 | 1 | 1.5 | 2 | 2.5 | 3 | 3.5 | 4 |
|---|---|---|---|---|---|---|---|---|---|---|
| Visc. (cps) | 63 | 107 | 119 | 111 | 107 | 99 | 90 | 88 | 85 | — |

EXAMPLE #4

Test temperature: 121° C.
Guar gum concentration: 0.42%
Bicarbonate concentration: 756 ppm
Crosslinker: zirconium triethanolamine
Zirconium concentration: 22 ppm
Crosslinked pH: 9.0

| Time (hrs.) | RT | 0 | 0.5 | 1 | 1.5 | 2 | 2.5 | 3 | 3.5 | 4 |
|---|---|---|---|---|---|---|---|---|---|---|
| Visc. (cps) | 55 | 94 | 108 | 120 | 111 | 103 | 96 | 87 | — | — |

EXAMPLE #5

Test temperature: 135° C.
Guar gum concentration: 0.60%
Bicarbonate concentration: 1453 ppm
Crosslinker: zirconium triethanolamine
Zirconium concentration: 26 ppm
Crosslinked pH: 9.0

| Time (hrs.) | RT | 0 | 1 | 2 | 3 | 4 | 5 | 6 | 7 | 8 |
|---|---|---|---|---|---|---|---|---|---|---|
| Visc. (cps) | 115 | 247 | 274 | 235 | 199 | 180 | 155 | 137 | 133 | 109 |

EXAMPLE #6

Test temperature: 149°C.
Guar gum concentration: 0.72%
Bicarbonate concentration: 1453 ppm
Crosslinker: zirconium triethanolamine
Zirconium concentration: 26 ppm
Crosslinked pH: 9.0

| Time (hrs.) | RT | 0 | 0.5 | 1 | 1.5 | 2 | 2.5 | 3 | 3.5 | 4 |
|---|---|---|---|---|---|---|---|---|---|---|
| Visc. (cps) | 167 | 394 | 307 | 269 | 226 | 196 | 157 | 138 | 115 | 100 |

EXAMPLE #7

Test temperature: 163° C.
Guar gum concentration: 0.72%
Bicarbonate concentration: 1453 ppm
Crosslinker: zirconium triethanolamine
Zirconium concentration: 26 ppm
Crosslinked pH: 9.0

| Time (hrs.) | RT | 0 | 0.5 | 1 | 1.5 | 2 | 2.5 | 3 | 3.5 | 4 |
|---|---|---|---|---|---|---|---|---|---|---|
| Visc. (cps) | 154 | 236 | 140 | 58 | 27 | — | — | — | — | — |

The cross-linking agent is preferably an organic zirconium or an organic hafnium compound. Suitable organic zirconium compounds include either zirconium lactate or a zirconium complex of lactic acid, also known as 2-hydroxypropanoic acid. Suitable zirconium complex lactates include zirconium ammonium lactate, zirconium triethanolamine lactate, zirconium diisopropylamine lactate, and zirconium sodium trilactate salts. Corresponding hafnium lactate and hafnium complexes of lactic acid may be used as cross-linking agents. Titanium containing compounds such as titanium ammonium lactate and titanium triethanolamine may also be used as cross-linking agents in the practice of the present invention.

Other organic zirconium or organic hafnium compounds useful as cross-linking agents include monoalkylammonium, dialkylammonium and trialkylammonium zirconium or hafnium compounds obtained by reacting an organozirconate or an organohafnate with monomethylamine, dimethylamine and trimethylamine, monoethylamine, diethylamine, and triethylamine, monoethanolamine, diethanolamine and triethanolamine, methyldiethanolamine, ethyldiethanolamine, dimethylethanolamine, diethylethanolamine, monoisopropanolamine, diisopropanolamine and triisopropanolamine, methyldiisopropanolamine, ethyldiisopropanolamine, dimethylisopropanolamine, diethylisopropanolamine, n-butylamine, sec. butylamine, dibutylamine and diisobutylamine. For example, a zirconium triethanolamine complex (Zr TEA) may be used as the cross-linking agent in the practice of the present invention. Zr TEA complexes are described in U.S. Pat. No. 4,534,870 and U.K. Patent Application 2,108,122.

Other organozirconium compounds useful as cross-linking agents include citrates and tartrates such as zirconium sodium citrate and zirconium sodium tartrate.

The compositions of the present invention include a cross-linking agent as described above, a guar gum gelling agent, and a bicarbonate salt. The gelling agent is present in the aqueous composition in a concentration in the range of from about 0.2 to 1.25%, preferably from about 0.2 to about 1.0% and most preferably from about 0.3 to about 0.8% by weight of the aqueous fluid. A concentration of guar gum of less than 0.2% by weight of the aqueous fluid is not sufficient to permit effective cross-linking.

The cross-linking agent is present in an amount from about 5 ppm to at least about 50 ppm of the aqueous fluid, and preferably in an amount from about 10 ppm to about 35 ppm.

The pH in the aqueous fracturing fluid is preferably in the range from about 8 to about 10 depending on the cross-linking agent. Generally the bicarbonate salt stabilizing agent will be present in an amount from about 250 ppm to about 3000 ppm, and preferably in an amount from about 350 ppm to about 2250 ppm.

It is understood that various other modifications will be apparent to and can readily be made by those skilled in the art without departing from the scope and spirit of this invention. Accordingly, it is not intended that the scope of the claims appended hereto be limited to the description set forth above, but rather that the claims be construed as encompassing all the features which reside in the present invention, including all features which would be treated as equivalents thereof by those skilled in the art to which this invention pertains.

What is claimed is:

1. An aqueous fracturing fluid having a pH from about 8 to about 10, consisting essentially of:
   guar gum in an amount from about 0.2 to about 1.25 weight percent to produce a fracturing fluid,
   at least one zirconium cross-linking agent in an amount from about 5 ppm to about 50 ppm to cross-link said guar gum, and
   a bicarbonate salt in an amount from about 250 ppm to about 3000 ppm. and sufficient to provide a relatively low viscosity at ambient temperature and a relatively high viscosity at elevated temperatures.

2. The aqueous fracturing fluid set forth in claim 1, wherein said zirconium cross-linking agent is zirconium. lactate.

3. The aqueous fracturing fluid set forth in claim 1, wherein said zirconium cross-linking agent is zirconium ammonium lactate.

4. The aqueous fracturing fluid set forth in claim 1, wherein said zirconium cross-linking agent is zirconium triethanolamine lactate.

5. The aqueous fracturing fluid set forth in claim 1, wherein said zirconium cross-linking agent is zirconium diisopropylamine lactate.

6. The aqueous fracturing fluid set forth in claim 1, wherein said zirconium cross-linking agent is zirconium sodium trilactate.

7. The aqueous fracturing fluid set forth in claim 1, wherein said zirconium cross-linking agent is a zirconium triethanolamine complex.

8. The aqueous fracturing fluid set forth in claim 1, wherein said zirconium cross-linking agent is zirconium sodium citrate.

9. The aqueous fracturing fluid set forth in claim 1, wherein said zirconium cross-linking agent is zirconium sodium tartrate.

10. The aqueous fracturing fluid set forth in claim 1, wherein said zirconium cross-linking agent is a zirconium monoalkylammonium complex.

11. The aqueous fracturing fluid set forth in claim 1, wherein said zirconium cross-linking agent is a zirconium dialkylammonium complex.

12. The aqueous fracturing fluid set forth in claim 1, wherein said zirconium cross-linking agent is a zirconium trialkylammonium complex.

13. A process for hydraulically fracturing a subterranean formation penetrated by a wellbore, comprising:
   preparing an aqueous fracturing fluid having a pH from about 8 to about 10 consisting essentially of guar gum in an amount from about 0.2 to about 1.25 weight percent to produce a fracturing fluid, at least one zirconium cross-linking agent in an amount from about 5 ppm to about 50 ppm to cross-link said guar gum, and a bicarbonate salt in an amount from about 250 ppm to about 3000 ppm, and sufficient to provide a relatively low viscosity at ambient temperature and a relatively high viscosity at elevated temperatures, and
   introducing said aqueous fracturing fluid into said formation from said wellbore at a flow rate and pressure sufficient to produce a fracture in said formation.

14. The process of hydraulically fracturing a subterranean formation set forth in claim 13, wherein said zirconium cross-linking agent is zirconium lactate.

15. The process for hydraulically fracturing a subterranean formation set forth in claim 13, wherein said zirconium cross-linking agent is zirconium ammonium lactate.

16. The process for hydraulically fracturing a subterranean formation set forth in claim 13, wherein said zirconium cross-linking agent is zirconium triethanolamine lactate.

17. The process for hydraulically fracturing a subterranean formation set forth in claim 13, wherein said zirconium cross-linking agent is zirconium diisopropylamine lactate.

18. The process for hydraulically fracturing a subterranean formation set forth in claim 13, wherein said zirconium cross-linking agent is zirconium sodium trilactate.

19. The process for hydraulically fracturing a subterranean formation set forth in claim 13, wherein said zirconium cross-linking agent is zirconium triethanolamine complex.

20. An aqueous fracturing fluid having a pH from about 8 to about 10, consisting essentially of:
 guar gum in an amount from about 0.2 to about 1.25 weight percent to produce a fracturing fluid,
 at least one organic hafnium cross-linking agent in an amount from about 5 ppm to about 50 ppm to cross-link said guar gum, and
 a bicarbonate salt in an amount from about 250 ppm to about 3000 ppm and sufficient to provide a relatively low viscosity at ambient temperature and a relatively high viscosity at elevated temperatures.

* * * * *